United States Patent [19]

Herrmann et al.

[11] Patent Number: 4,631,467
[45] Date of Patent: Dec. 23, 1986

[54] ESCALATOR PASSENGER FLOW CONTROL

[75] Inventors: Dietrich E. Herrmann, Vechelde; Detlev Abraham, Berlin, both of Fed. Rep. of Germany

[73] Assignee: Otis Elevator Company, Farmington, Conn.

[21] Appl. No.: 738,336

[22] Filed: May 28, 1985

[51] Int. Cl.$^4$ .............................................. H02P 5/40
[52] U.S. Cl. .................................. 318/798; 318/806; 318/807; 198/330
[58] Field of Search ................. 318/803, 807–811, 318/798, 806; 198/330

[56] References Cited

U.S. PATENT DOCUMENTS

| 3,899,725 | 8/1975 | Plunkett | 318/802 |
| 4,263,542 | 4/1981 | Schulze et al. | 318/807 |
| 4,276,500 | 6/1981 | Sumka et al. | 318/369 |

FOREIGN PATENT DOCUMENTS 2050984A 1/1981 United Kingdom .
2139831A 11/1984 United Kingdom .

OTHER PUBLICATIONS

Pamphlet, "Lenze Antriebstechnik", by Maschinenfabrik Stahlkontor Weser Lenze GmbH & Co.

Primary Examiner—David Smith, Jr.
Attorney, Agent, or Firm—Gerald E. Linden

[57] ABSTRACT

A variable-frequency, variable-voltage (VVVF) converter is interposed in the line between an AC source and an asynchronous escalator motor. Current to the motor is sensed to determine load in conjunction with a passenger detector and load simulating electronic system and the frequency and voltage of the converter are automatically adjusted in response thereto to control escalator speed. The system includes a converter to supply the asynchronous drive motor of the escalator with variable frequency and an appropriate control circuit for manual or automatic operation of the escalator at different speeds, which is equivalent to different motor frequencies.

4 Claims, 11 Drawing Figures

ESCALATOR PASSENGER FLOW CONTROL

DESCRIPTION

Technical Field of the Invention

The invention relates to regulating passenger flow in an escalator by varying its speed.

BACKGROUND OF THE INVENTION

Most escalators run continuously at a fixed speed. This, of course, wastes energy when there is no traffic. One solution is to start the escalator only when a passenger approaches. However, frequent starting of the escalator greatly increases mechanical wear. Furthermore, passengers may shy away from a stopped escalator, believing it to be out of service. Another solution is to provide two speeds of operation; a high speed for transporting passengers, and a lower, idle speed when the escalator is unoccupied. Such a concept is disclosed, for instance, in the context of DC motor control, in commonly-owned U.K. Patent Application No. G.B. 2,050,984A. The requirement to influence the quantity of passengers moved by an escalator, particularly in public transport systems, such as undergrounds or other railway systems, is another problem.

It is known to vary the speed of an AC motor by reducing the voltage supplied thereto with an AC chopper. Since the torque of the motor is proportional to the square of the voltage, speed can indirectly be influenced this way. However, this technique for motor speed control suffers from high motor losses and thus low efficiency at low speeds. This is because the speed is controlled by means of changing the slip, what is the only way when having a fixed motor frequency. Furthermore, in order to provide regulated motor speed throughout the entire speed range, additional regulating devices are required.

DISCLOSURE OF THE INVENTION

Therefore, it is an object of this invention to optimize escalator operation by varying speed as a function of load. The concept presented here is advanced against the previous solutions which are characterized by offering two states of operation only; the advantage means that any speed can be realized by manual control on one hand or by an automatic control thorugh passenger load detection and corresponding adjustment to any speed from zero to the maximum value according to design.

According to the invention, a variable-frequency, variable-voltage (VVVF) converter is interposed in the line between an AC source and an asynchronous escalator motor. Current to the motor is sensed to determine load in conjunction with a passenger detector and a load simulating electronic system, and the frequency and voltage of the converter are automatically adjusted in response thereto to control escalator speed.

The system includes a converter to supply the asynchronous drive motor of the escalator with variable frequency and an appropriate control circuit for manual or automatic operation of the escalator at different speeds, which is equivalent to different motor frequencies.

The benefits are improved performance and passenger transport control.

The performance benefits are:

- the possibility of choosing run-up and slow-down times (acceleration and deceleration) to provide no jerks and thus reduced wear.
- adjustable currents when starting, thus making unnecessary the commonly known star/delta contactors that keep starting currents low with existing motor drives to prevent peak loads on the line.
- the power factor for the line equals nearly one and is constant over the whole load range of the motor which itself has a power factor that decreases very much when reducing the load. This is very important, because escalators idle for long periods.
- the overall power consumption is reduced due to improved utilization of the motor that operates at different speeds (frequencies) always in a small range of slip.
- reduced power consumption when idling at a lower speed has the most importing impact.

The benefits of an escalator with passenger transport control are:

- the possibility of local transport authorities (e.g. station masters) to control the passenger flow by varying speed manually according to the actual situation monitored by the station master himself
- the possibility of realizing a low escalator speed when idling (no passengers) to avoid the presently used total shut-down (speed zero) which has a negative psychological effect on a passenger viewing the nonoperating escalator.
- the most important possibility to operate the escalator with a closed loop control in an automatic way adjusting its speed according to its passenger load. This means providing a "passenger friendly" system with essential (low power consumption, low wear) economical advantages for the operating company.

Other objects, features and advantages of the invention will become apparent in light of the following description thereof.

BRIEF DESCRIPTION OF THE DRAWINGS

FIG. 8 is a schematic of a control circuit to correlate escalator data and passenger load to provide a speed set signal for the converter. It is known to operate an asynchronous 3-phase motor with a variable-frequency converter. For instance, U.K. Patent Application No. GB 2,139,831A shows a rectifier-battery-inverter arrangement that does precisely that.

BEST MODE FOR CARRYING OUT THE INVENTION

Figure 1:
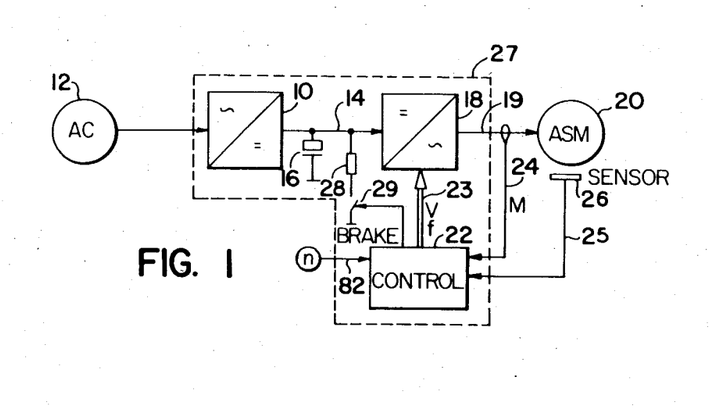
FIG. 1 is a block diagram of the frequency converter for this invention.

FIG. 1 shows a simple arrangement for providing asynchronous motor speed control, as practiced in this invention. A rectifier 10 converts AC line voltage from a source 12 to DC on a line 14. A buffer capacitor 16 is across the DC line 14. A variable-frequency, variable-voltage (VVVF) inverter converts the DC on the line 14 to AC, whereupon it is supplied on a line 19 to an asynchronous escalator motor 20. The frequency and voltage of the AC on the line 19 determines motor speed, as illustrated hereinafter. A control circuit 22 provides variable-frequency control pulses (V$_f$) on a line 23 to the inverter 18 in response to a dictated reference for speed (n). The control loop is closed by a torque feedback signal (M), which is essentially sensed motor current as provided on a line 24, and by a detected speed signal on a line 25 as provided by a sensor 26. The frequency of the control pulses Vf ultimately determine motor speed. The combination of the rectifier 10, the inverter 18, and the control circuit 22 is known as a "converter" 27.

A brake is essentially a resistor 28 that is shunted across the DC line 14 by a switch 29 when a signal (brake) from the control circuit is indicative of power coming from the motor, being in generative operation.

Figure 2:
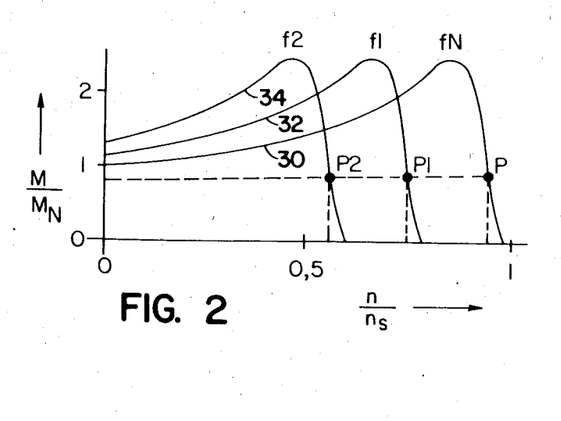
FIG. 2 is a graph of torque versus speed of a converter supplied asynchronous motor at different frequencies.

FIG. 2 shows the relationship between torque and speed for the variable-frequency control of FIG. 1. The vertical axis is the ratio of measured torque (M) to rated torque (M$_N$). The horizontal axis represents the ratio of actual speed (n) to motor-rated synchronous speed (n$_s$). A curve 30 shows the relationship when the motor is supplied with its nominal (rated) frequency f$_N$, which is normally 50 Hz or 60 Hz. A curve 32 shows the relationship when the motor frequency is reduced to value f1 that is smaller than the nominal frequency f$_N$. A curve 34 shows the relationship when the motor frequency is further reduced to f2. Possible operation points at different speeds are represented by the points P, P$_1$, and P$_2$, with the slip for those speeds being 1 minus the x-axis coordinate (n/ns) for the respective point.

Figure 2A:
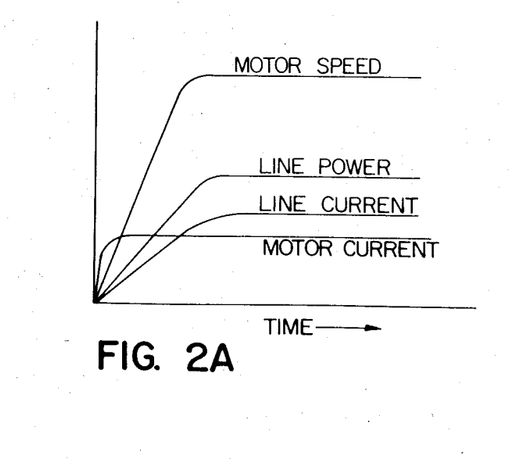
FIG. 2a is a graph of measured speed, power and currents versus time.

FIG. 2A shows the relationship of motor speed, line power, line current, and motor current that is representing the motor torque for a typical escalator, all with respect to time from start-up. It shows clearly the mentioned features as motor current being in the range of the steady state current also during starting period (run-up time) when the speed increases linearly from zero to a preset value.

Figure 3:
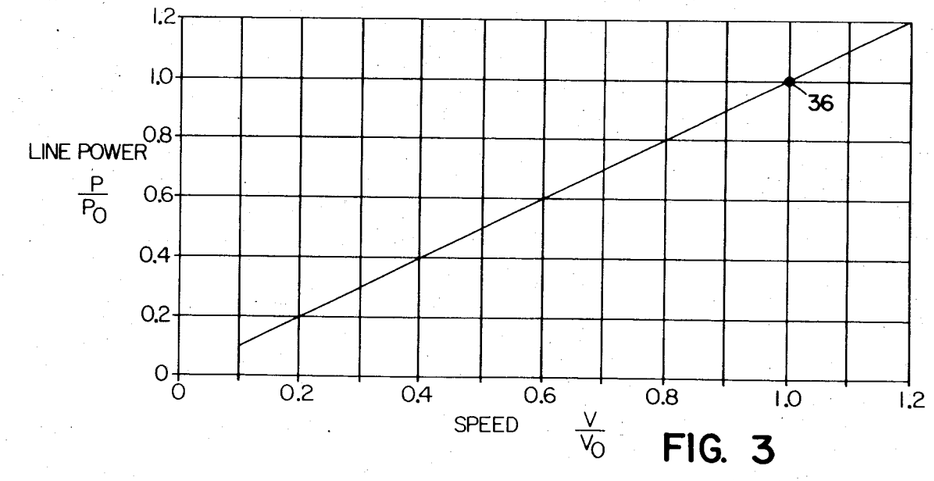
FIG. 3 is a graph of measured line power versus speed for an idling escalator.

The input (line) power is directly proportional to speed for a given constant torque. FIG. 3 shows this relationship, with the VVVF converter of this invention, which can be calculated from the following simplified mathematical model of an escalator:

$$P = V(M_L + M_F)$$

where
P is the input power;
V is the running speed;
M$_L$ is the load torque; and
M$_F$ is the friction torque.
(Subscript o indicates idling, no load.)
A point 36 on the curve represents the escalator operating point when idling. P$_o$ is the rated motor power when idling without VVVF and V$_o$ is the corresponding motor speed. (Actually, the point 36 is slightly above P/P$_o$=1 due to VVVF losses.)

Figure 4:
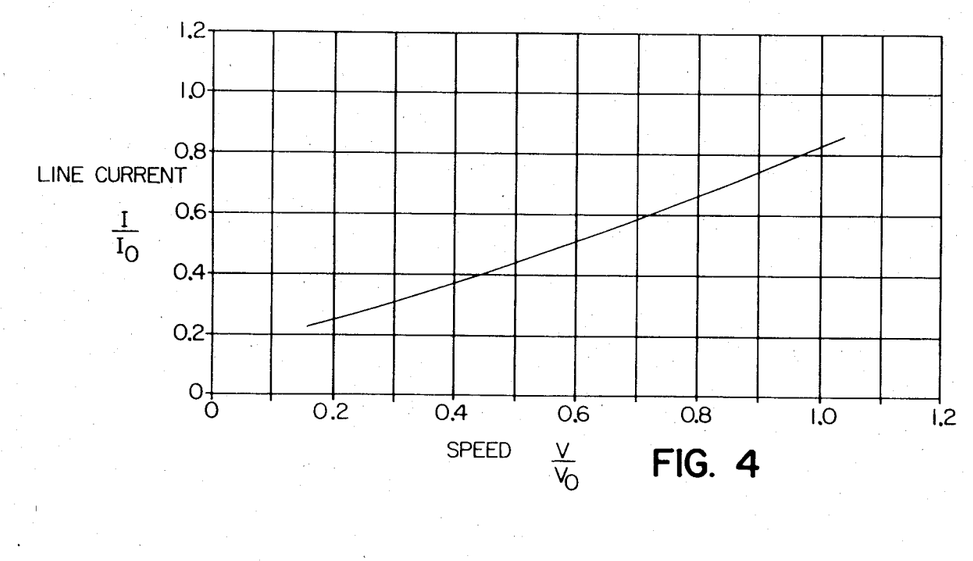
FIG. 4 is a graph of measured line current versus speed for an idling escalator.

It follows then, since power is proportional to speed (for constant torque), that current is similarly related (linear), as shown in FIG. 4. The power factor for the entire system of converter and motor is high at any torque, so that the ratio of I/I$_O$ is always less than 1. The motor running directly on the line has a smaller power factor that decreases again with smaller torques.

Figure 5:
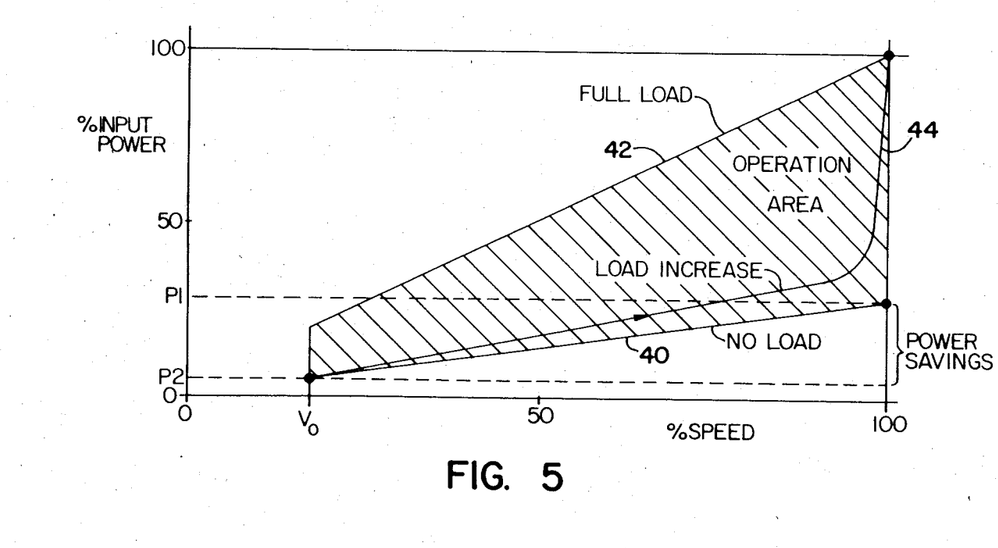
FIG. 5 is a graph of input power versus speed for the whole escalator operation range.

FIG. 5 is a graph of input power (P), by percent, to motor speed, by percent, over the speed range of the motor. The line 40 shows the relationship for no load and represents the graph of FIG. 3. The line 42 shows the relationship for full load. The curve 44 shows the relationship for an intermediate load. An idling escalator running at nominal speed takes the power P$_1$, the same escalator at reduced (minimum) speed V$_O$ takes only P$_2$. This power decrease (P$_1$−P$_2$) will cause a reduced energy consumption from the line when the operating times are known and correlated with the power savings, because Energy=Power×Time.

In order to regulate the running speed as a function of passenger load, a function needs to be defined. The function requires a tradeoff between low running speeds, which will effect the greatest energy savings, and the psychological effect that a low running speed has on the passengers. In any case, the customer can specify a speed suitable for their requirement.

Figure 6:
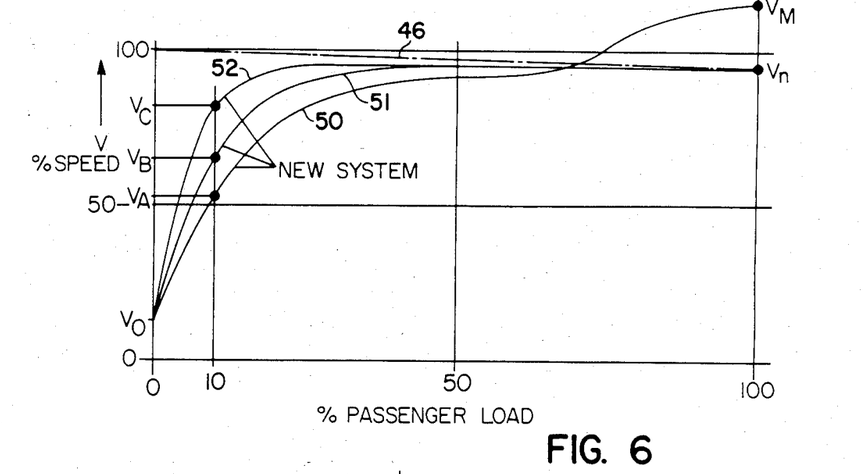
FIG. 6 is a graph of escalator speed versus passenger load at different operation functions.

FIG. 6 shows exemplary functions, in graphic form. It is readily apparent by the line 46 that a conventional system has a nearly constant speed over the whole range of passenger loading; when empty it is 100 percent speed and at full 100 percent load it is a little less down to rated speed (V$_n$).

By contrast, the system of this invention can be adjusted to points lying on the shown exemplary plots 50, 51, 52 and demonstrating that the escalator speed will be at a minimum (V$_o$) when idling and can be V$_A$ or V$_B$ or V$_C$ at a passenger load of 10 percent, according to the chosen function. The function represented by the plot 50 additionally shows the possibility of increasing the speed to a maximum value (V$_M$), which is greater than the rated speed (V$_n$), at 100 percent passenger loading.

Figure 6A:
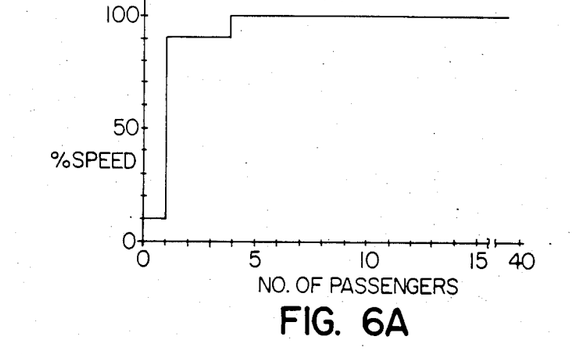
FIG. 6a is a graph of escalator speed versus passsenger load with discrete correlations, low range of speed variations.
Figure 6B:
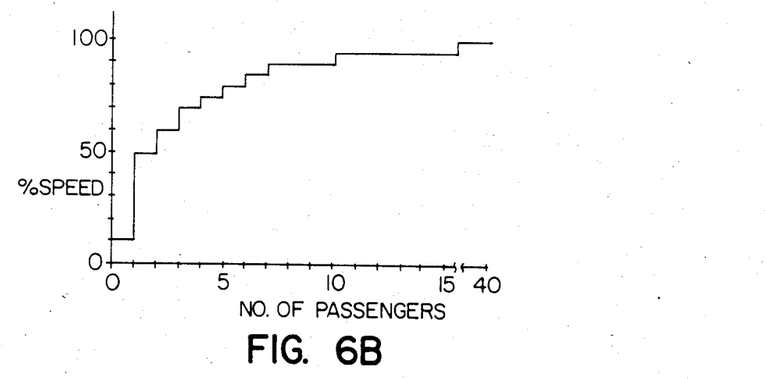
FIG. 6b is a graph of escalator speed versus passenger load with high range of speed variations.

FIG. 6a and 6b are realistic correlations between escalator speeds and passenger loads with two different features. FIG. 6a shows only one additional speed (90 percent) between idling (10 percent) and full speed (100 percent) demonstrating that the first passenger approaching initiates the control for 90 percent speed, the fifth passenger for 100 percent speed. FIG. 6b follows the same idea but contains eight intermediate speed values. (40 passengers=100 percent passenger load).

Figure 7:
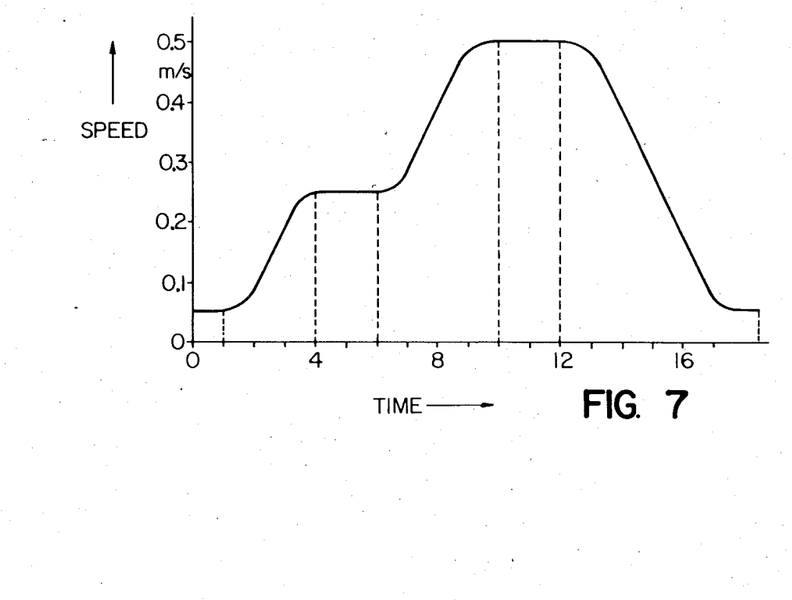
FIG. 7 is a graph of escalator speed versus time at different passenger load changes.

The transition between two operational speeds is done under such conditions that the acceleration or deceleration and jerks are within high comfort conditions for passengers as shown in an exemplary way in FIG. 7.

The function can be established in an open loop manner simply by setting a parameter. Alternately, the speed can be set in a closed loop manner by sensing the passenger load by means of known entry devices, such as a light ray through which the passenger must pass. The closed loop control for automatic operation at different speeds consists of a passenger detector and an appropriate electronic load simulation system, being part of this invention.

Figure 8:
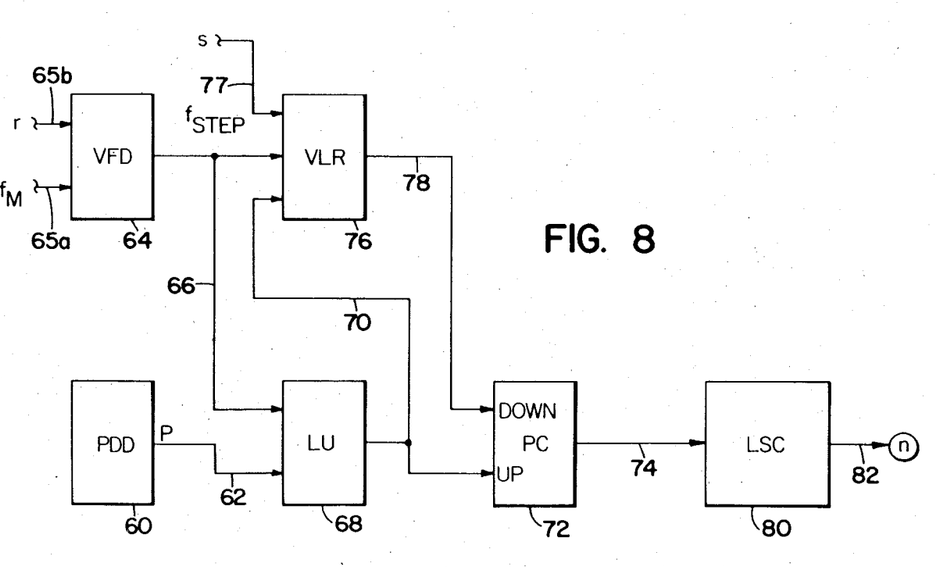

FIG. 8 is a block diagram of the closed loop control system. The system correlates escalator-specific data, such as motor:step chain speed ratio (r) and the number of steps (s) in a "run", with measured data, such as motor frequency (fm) and number of passengers on the escalator (p) in order to provide the speed reference signal (n) to the converter (see FIG. 1).

The approach of a passenger is detected by a Passenger Detection Device (PDD) 60, such as a light ray barrier, a contact mat, or a radar detector at the escalator entry terminal, which provides a signal (p) on a line 62 for each occurrence thereof. Meanwhile, a Variable Frequency Divider (VFD) 64 divides a motor frequency (fm) signal on a line 65a by a motor:step chain speed ratio (r) signal on a line 65b to provide a signal (f step) on a line 66 indicative of the step speed. The step speed signal (fstep) and the passenger signal (p) are correlated in a Logic Unit (LU) 68 to provide an up-signal on a line 70 which increments an up/down passenger counter (PC) 72 for each occurrence of a passenger entering the escalator.

The Logic Unit 68 correlates the number of detected passenger P with the number of possible passengers on the steps, which depends on the step width and empirical values describing the loading of an escalator. There is a maximum value of three passengers standing of two steps, even when the passenger detector PDD 60 gives a higher number due to jamming on the entry side of the escalator. The normal situation is one passenger per step. Hence, the Logic Unit 68 determines the "real" number an escalator can carry.

The counter output on a line 74 must be indicative of the number of passengers actually on the escalator at any given time, rather than the cumulative number of passengers who have entered the escalator. Therefore, the up-signal on the line 70 also is provided to a variable length shift register (VLR) 76. The "length" of the VLR is determined by the number of steps, as indicated by the signal(s) on a line 77, and it is driven by the step speed signal (f$_{step}$). Thus an up-signal, representative of a passenger entering the escalator is shifted to the output 78 of the VLR after an appropriate time which models the escalator performance. Once output by the VLR 76, the up-signal becomes a down-signal which decrements the counter 72. A load-speed converter (LSC) 80 converts the digital output of the counter 72 to an appropriate analog signal on a line 82, which is the speed reference signal (n) to the controller 22 of the power converter of FIG. 1. Thus, the greater the traffic, the greater the speed of the escalator.

We claim:
1. A circuit for providing a load signal (74) indicative of the number of passengers on an escalator, comprising:
   means (66) for providing a step speed signal (f$_{step}$) indicative of the speed of the escalator;
   means (77) for providing a step number signal (s) indicative of the number of steps in an escalator run;
   sensor means (60) for providing an entry signal (P) indicative of the entry of a passenger onto the escalator;
   variable length shift register means (76) for providing a down signal (78) in response to the entry signal (p) having moved through the shift register, wherein the length of the register is determined by the step number signal (s) and the rate of the register is determined by the step speed signal (f$_{step}$); and
   up/down counter means (72) for incrementing the load signal (74) in response to each occurrence of the entry signal and for decrementing the load signal in response to each occurrence of the down signal (78).

2. A circuit according to claim 1 characterized by:
   means (65b) for providing a first signal (r) indicative of the speed ratio of the escalator drive motor and step chain;
   means (65a) for providing a second signal (f$_m$) indicative of the escalator drive motor speed; and
   divider means (64) for providing the step speed signal (f$_{step}$) in response to the first and second signals.

3. A circuit according to claim 1 characterized by:
   logic means (68) for altering the value of the signal (P) based on the possible number of passengers on the steps, which depends on the step width and empirical values describing the loading of the escalator.

4. An escalator comprising:
   an asynchronous drive motor (20);
   a control circuit (22) for providing variable-frequency control pulses (V$_f$), the frequency of which are related to a speed reference signal (n) indicative of a desired running speed for the drive motor (20);
   a variable-frequency, variable-voltage inverter (18) connected to the drive motor (20) for controlling the speed thereof in response to the frequency of the variable-frequency control pulses (V$_f$) from the control circuit (22);
   characterized by:
   means (66) for providing a step speed signal (f$_{step}$) indicative of the speed of the escalator;
   means (77) for providing a step number signal (s) indicative of the number of steps in an escalator run;
   sensor means (60) for providing an entry signal (P) indicative of the entry of a passenger onto the escalator;
   variable length shift register means (76) for providing a down signal (78) in response to the entry signal (p) having moved through the shift register, wherein the length of the register is determined by the step number signal (s) and the rate of register is determined by the step speed signal (f$_{step}$); and
   up/down counter means (72) for incrementing the load signal (74) in response to each occurrence of the entry signal and for decrementing the load signal in response to each occurrence of the down signal (78); and
   means (80) for providing the speed reference signal (n) to the controller as a function of the load signal (74).

* * * * *